United States Patent [19]

Eitel et al.

[11] Patent Number: 4,844,603
[45] Date of Patent: Jul. 4, 1989

[54] COOLED FLEXIBLE MIRROR ARRANGEMENT

[75] Inventors: Frederick G. Eitel, North Palm Beach; Charles C. Thompson, Jupiter, both of Fla.

[73] Assignee: United Technologies Corporation, Hartford, Conn.

[21] Appl. No.: 138,635

[22] Filed: Dec. 24, 1987

[51] Int. Cl.⁴ .......................... G02B 5/08; G02B 7/18
[52] U.S. Cl. .................................... 350/611; 350/610
[58] Field of Search .............. 350/360, 361, 609, 610, 350/611, 631, 632

[56] References Cited

U.S. PATENT DOCUMENTS

| 4,202,605 | 5/1980 | Heinz | 350/610 |
| 4,295,710 | 10/1981 | Heinz | 350/611 |
| 4,492,431 | 1/1985 | Eitel et al. | 350/611 |
| 4,657,358 | 4/1987 | Anthony et al. | 350/610 |
| 4,674,848 | 6/1987 | Aldrich et al. | 350/611 |
| 4,679,915 | 7/1987 | Kriz et al. | 350/610 |
| 4,734,557 | 3/1988 | Alfille et al. | 350/611 |
| 4,770,521 | 9/1988 | Thompson et al. | 350/610 |

OTHER PUBLICATIONS

Everson et al., "Evaluation of a Deformable Monolithic Mirror/Heat Exchanger Unit," *SPIE vol. 179: Adaptive Optical Components II*, (1979), pp. 91-97.
Everson et al., "Device Parameters and Optical Performance of a Stacked Actuator Deformable Mirror,"0 *SPIE vol. 228: Active Optical Devices and Applications* (1980), pp. 34-40.
Albertinetti et al., "Deformable Mirrors with Bimorph Actuators," *SPIE vol. 179: Adaptive Optical Components II* (1979), pp. 28-31.
Henderson et al., "System Performance of a Large Deformable Mirror ..." *SPIE vol. 179: Adaptive Optical Components II* (1979), pp. 51-60.

Primary Examiner—Bruce Y. Arnold
Assistant Examiner—Martin Lerner
Attorney, Agent, or Firm—Peter R. Ruzek

[57] ABSTRACT

A mirror arrangement includes a flexible faceplate having a reflective surface and a flexible backing plate which are so mounted on a support that the backing plate is situated behind the faceplate with a gap in between. An array of elongated actuators is arranged on the support rearwardly of and perpendicularly to the backing plate. Each actuator includes an actuating member which is movable in the longitudinal direction of the actuator and exerts a selected force on the backing member at least when the respective actuator is energized. This force is transmitted to the faceplate through respective actuator posts. The gap is sealed with respect to the exterior of the mirror arrangement to form an enclosed cooling chamber. A cooling fluid is supplied to the cooling chamber through supply pipes and discharged therefrom through discharge pipes that are fixed to the support and arranged between the actuators and that communicate with the cooling chamber through respective inlet and outlet openings that are provided in the backing plate and alternate with one another in respective rows. Regions of the backing plate that surround the actuator posts may be prestressed during the installation of the actuators to keep these regions in contact with the movable members of the actuators even during negative displacement.

21 Claims, 2 Drawing Sheets

COOLED FLEXIBLE MIRROR ARRANGEMENT

TECHNICAL FIELD

The present invention relates to mirror arrangements in general, and more particularly to mirror arrangements including a flexible mirror that is acted upon by at least one actuator to change the shape of the mirror and/or that is cooled by a cooling fluid that circulates behind the mirror.

BACKGROUND ART

In the field of high-power lasers having large beam diameters, it is common for the quality of the optical beam emerging from the laser gain medium to be inadequate for the purposes on hand, especially since the wave front is not ideal, that is, phase shifts exist between different regions of the cross section of the laser beam. To deal with this situation, it has already been proposed to aim the emerging laser beam against a reflecting surface of a thin flexible mirror faceplate for the laser beam to be reflected by the reflective surface, and to adjust the contour or shape of the thin flexible plate by means of one or more actuators which extend forward and backward and thus change the shape and contour of the flexible plate and thus the contour of the reflective surface of the mirror. The deformable mirror can be used to alter the wave front of the laser beam to allow the laser beam to be propagated more easily through the medium into which it is ultimately injected for propagation, such as through the atmosphere.

In order to be able to correct for optical phase distortions to a high energy laser (HEL) beam as it is propagated through the atmosphere, it has been established that there is a pronounced need for the use of deformable mirrors acted upon and deformed by closely packed actuators, which may have to be spaced at less than 1 centimeter apart. With the advent of more powerful HELs, the beam size, of necessity, increases, resulting in the need for using very large numbers of closely packed actuators, and in the need for using active cooling to remove absorbed heat energy from the mirror.

The closely packed actuator array causes difficulties in the employment of replaceable actuator design features. This is so because the required small spacing of the actuators does not offer reasonable sizing of the necessary mechanical features as executed in state-of-the-art designs. Moreover, heretofore known replaceable actuator designs are known to possess deficiencies with respect to current and future needs, particularly for short wavelength devices.

So, for instance, the force train mechanism of the actuator arrangement has many components whose alignment and fabrication accuracy are critical to proper operation. In conventional constructions of deformable mirrors in which the actuators of the actuator arrangement act on the mirror faceplate through respective actuator pads formed on the rear side of the faceplate, in which retracting springs act on the faceplate in the rearward direction, and in which a heat exchanger or cooling chamber is situated behind the faceplate, actuator replacement may result in unacceptable mirror shape degradation because of the force train variations which occur as a result of such replacement. In such known arrangements, even small force train misalignments result in the application of unacceptable moments to the heat exchanger, and these moments then cause distortion of the reflective surface of the faceplate. The actuator to faceplate interface is critical because of the faceplate and reflective surface sensitivity to bending moments. Such bending moments result from tolerance errors and they cause a misalignment in the respective path in which the actuator load is applied to the respective actuator pad of finite height, where the bending moment is proportional to the pad height. Such misalignment may be the result of eccentricity and squareness tolerance, retraction spring offset, contour mismatch in spherical joints, and "walking" (non-slip) in spherical joints during operation.

Moreover, during actuator removal and installation, the full force of the retraction spring is applied to the heat exchanger. The force applied by the retraction spring is usually sufficient to cause intolerable stresses in the heat exchanger of the finished mirror, and could produce unwanted reflective surface degradation. Also, binding and galling of the threads of the actuator assembly could present actuator removal difficulties. Thread backlash, roughness and friction characteristics affect the adjustment resolution of the respective actuator assembly. Mechanical locking of threads imposes strains that shift the adjusted surface.

Another disadvantage of known constructions of the cooled flexible mirror assemblies is that the mirror heat exchanger designs that have been heretofore used are not compatible with the currently required close packing of the actuators and with large mirror apertures. Large differential strokes between adjacent actuators cannot be tolerated in the applications with which the present invention is concerned while using conventional channel flow heat exchangers because flexural stiffness and resulting stress levels are too high. Moreover, large aperture designs either require high pressure loss (for a single zone), which results in high stresses, or must accommodate multiple cooling zones, which results in mechanically complex interfaces between the coolant supply and the heat exchanger.

Accordingly, it is a general object of the present invention to avoid the disadvantages of the prior art.

More particularly, it is an object of the present invention to provide a mirror arrangement which does not possess the disadvantages of the known mirror arrangements of this kind.

Still another object of the present invention is so to develop the mirror assembly of the type here under consideration as to be compatible with very close packing of the actuators and relatively large surface deformations between adjacent actuators.

It is yet another object of the present invention to devise a mirror arrangement of the above type which reduces tolerance effects on and particularly the application of bending moments to the faceplate carrying the reflective surface of the mirror to a minimum, if not eliminating them altogether.

An additional object of the present invention is to design the above mirror arrangement in such a manner as to provide low thermal distortion and low jitter characteristics, and to be scalable to very large sizes without performance loss or geometry changes.

A concomitant object of the present invention is construct the mirror arrangement of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in a mirror arrangement comprising a support; a flexible faceplate having a reflective surface; a flexible backing plate; and means for so mounting the faceplate and the backing plate on the support that the reflective surface faces forwardly and the backing plate is situated rearwardly of the faceplate and that the backing plate and the faceplate delimit a gap between themselves. The mirror arrangement of this invention further includes a plurality of elongated replaceable actuators arranged on the support rearwardly of the backing plate in a predetermined distribution pattern and each having a longitudinal axis and including a mounting member which is so stationarily mounted on the support that the longitudinal axis extends substantially perpendicularly to the backing plate and an actuating member which is movable along the longitudinal axis relative to the mounting member and exerts a selected force on the backing member at least when the respective actuator is energized. According to the invention, the mirror arrangement further includes means for transmitting the forces exerted by the actuating members on the backing plate to the faceplate, such transmitting means including a plurality of transmitting portions situated between the backing plate and the faceplate each in alignment with a different one of the actuators.

A particular advantage of the mirror arrangement of the present invention as described so far is that the actuators act on the backing plate and that the backing plate thus acts as an intermediary between the actuators and the faceplate. As a result, the actuator loading can be applied to the faceplate without the need for permanently bonding the actuators to the faceplate, since the backing plate provides the needed faceplate retraction force. Therefore, the actuators need only to push but not to pull.

Advantageously, the interface between each actuator and the backing plate consists of a flat rear surface of the backing plate and a crowned actuator nose that engages this flat rear backing plate surface, so that any actuator axis misalignment cannot impose a moment and an attendant moment deflection on the faceplate. As a result, offset tolerance at the interface between the actuator and the backing plate is the only mechanism by which surface distortion can be imposed on the faceplate. This mechanism is easily controlled and does not constitute tolerance accumulations due to individual elements within the actuator load path. Since there are no bond joints between the actuators and the faceplate, the actuators are readily replaceable, with no need for repolishing the reflective surface of the faceplate after actuator replacement.

Another important advantage of the present invention is that the backing plate produces retraction forces that are applied against the actuators. This provides the possibility of taking appropriate measures that result in negative stroke capability.

The present invention is also directed to a mirror arrangement comprising a support; a flexible faceplate having a reflective surface; a flexible backing plate; and means for so mounting the faceplate and the backing plate on the support that the reflective surface faces forwardly and the backing plate is situated rearwardly of the faceplate and that the backing plate and the faceplate delimit a gap between themselves. According to this aspect of the present invention, there is provided at least one elongated actuator arranged on the support rearwardly of the backing plate, having a longitudinal axis and including a mounting member which is so stationarily mounted on the support that the longitudinal axis extends substantially perpendicularly to the backing plate and an actuating member which is movable along the longitudinal axis relative to the mounting member and exerts a selected force on the backing member at least when the respective actuator is energized, and means for transmitting the force exerted by the actuating member on the backing plate to the faceplate. This mirror arrangement additionally includes means for sealing the gap with respect to the exterior of the mirror arrangement to form an enclosed cooling chamber; and means for circulating a cooling fluid through the cooling chamber.

This particular construction of the mirror arrangement of the present invention has the advantage that, since the cooling chamber is located between the faceplate and the backing plate and is actually delimited by the faceplate, on the one hand, and by the backing plate, on the other hand, the cooling fluid is in intimate contact with the faceplate and thus efficiently removes absorbed heat therefrom. Moreover, because of the gap-shaped configuration of the cooling chamber and the provision of the backing plate, it is possible in a very simple manner to so construct and arrange the circulating means as to achieve laminar flow of the cooling fluid in the cooling chamber, thus eliminating faceplate jitter which could otherwise result from turbulence in the cooling fluid flow.

BRIEF DESCRIPTION OF THE DRAWINGS

The present invention will be described in more detail below with reference to the accompanying drawing, in which.

BEST MODE FOR CARRYING OUT THE INVENTION

Figure 1:
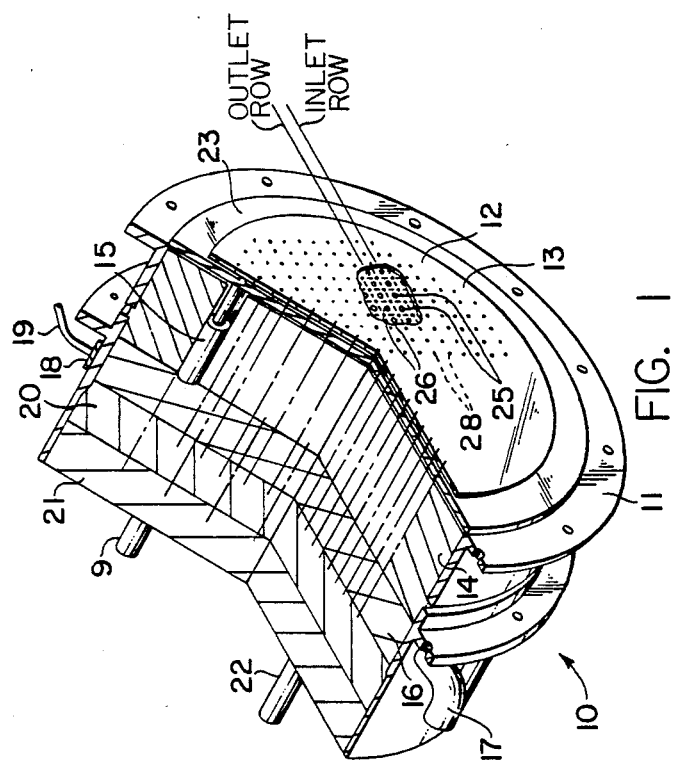
FIG. 1 is a perspective view, partly broken away and partly in section, of a mirror assembly incorporating the present invention.

Referring now to the drawing in detail, and first to FIG. 1 thereof, it may be seen that the reference numeral 10 has been used therein to identify a mirror assembly embodying the present invention. The mirror assembly 10 includes a number of components or modules that can be assembled with and disassembled from one another. These components include, from front to back, a cylinder mount 11, a mirror faceplate 12 having a reflective surface 13, a substrate or support 14 which is rigidly connected to the cylinder mount 11 and carries the faceplate 12, a plurality of elongated replaceable actuators 15 which are mounted on the support 14 for adjustment of their axial positions but which remain in their selected adjusted positions after such adjustment, a discharge plenum 16 for discharging cooling fluid, which is provided with a coolant discharge conduit 17 and with a sealed plug 18 through which actuator wiring 19 leading to the actuators 15 passes, an actuator supply plenum 20 from which fresh cooling fluid is supplied and distributed to the actuators 15 to cool the same, and a faceplate supply plenum 21 having a faceplate coolant inlet conduit 22 through which faceplate cooling fluid is admitted into the faceplate supply plenum 21 to be supplied therefrom, in a manner which will be discussed in more detail later, to the faceplate 12 to cool the same. An actuator coolant inlet conduit 22 passes through the faceplate supply plenum 21 and opens into the actuator supply plenum 20.

The actuators 15 are of a known construction which need not be described here. Suffice it to say that each actuator 15 includes a stationary mounting part or member which is axially adjustably and replaceably but otherwise immovably mounted on the support 14, as alluded to before, and a movable actuating part or member which moves relative to the mounting member and/or changes its axial dimension in dependence on the energization of the respective actuator 15 by electric energy supplied to the respective actuator 15 through the wiring 19. In the assembly 10 of FIG. 1, the actuators 15 are actively cooled for thermal growth control. The actuator cooling system is separate from a faceplate cooling system and may not be required for all types of actuators.

The actuators 15 are arranged in a square array at a spacing of about 0.91 centimeter between their respective axes, with actuators omitted from each corner of the array to provide a circular active aperture. An extra row of non-active (dummy) actuators is placed outside the active aperture to create the effect of a non-fixed edge boundary. This feature allows for, an improved contour match to the desired surface configuration at the aperture edge.

The above explanation has been provided solely for the purpose of presenting the environment in which the present invention is being used, with the details of the arrangement of the present invention being discussed below. However, it may be mentioned at this juncture to complete the picture that, as indicated in a portion of the assembly 10 where the faceplate 12 has been broken away that a backing or spring plate 23 of a resilient material is arranged at a rearward spacing from the faceplate 12 to define a gap of a predetermined width with the faceplate 12, that this gap is sealingly closed at its periphery to form a cooling chamber 24, and that the faceplate cooling fluid is admitted into the cooling chamber 24 through respective rows of inlets 25 and discharged from the cooling chamber 24 through respective rows of outlets 26 that are provided in the backing plate 23 and that are only diagrammatically indicated in FIG. 1 of the drawing by respective lines showing the locations and directions of one row of the inlets 25 and one row of the outlets 26.

Figure 2:
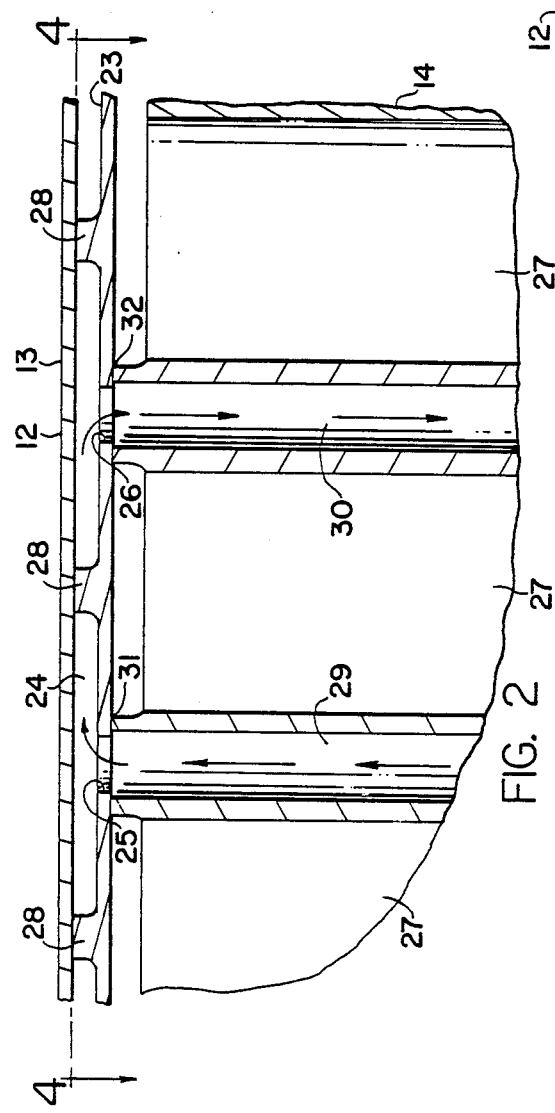
FIG. 2 is an axial sectional view of a detail of FIG. 1, taken on line 2—2 of FIG. 4, but omitting respective actuators.

Turning now to FIG. 2 of the drawing, it may be seen there that the support 14 has respective passages 27 which are dimensioned to individually receive the movable parts of the respective actuators 15. The actuators 15 have been omitted from FIG. 2 for simplification. However, FIG. 2 of the drawing clearly shows that the backing or spring plate 23 is provided with a plurality of discrete actuator posts 28 which extend across the aforementioned gap and are centered on the respective actuator axes. The actuator posts 28 are shown to be integral with the backing plate 23, and they are connected with the faceplate 12, preferably by brazed joints to constitute respective transmitting portions that transmit forces between the backing plate 23 and the faceplate 12. The faceplate 12 is relatively thin (about 0.07 cm), and so is the backing plate 23 (about 0.04 cm). The actuator posts 28 are about 0.2 cm in diameter and 0.064 cm in length.

FIG. 2 of the drawing also indicates that respective coolant inlet ducts 29 and coolant outlet ducts 30 are situated between the respective actuator passages 27. These ducts 29 and 30 are preferably provided in the support 14; however, they could also be formed in discrete pipes or tubes instead, in which case such tubes or pipes would have to possess a high degree of rigidity and would have to be rigidly connected to the support 14 so as to assure that their end portions that are close to the backing plate 23 remain immovable relative to the support 14. The solid regions surrounding the ducts 29 and 30 are sealed to the backing plate 23 around the respective inlet openings 25 and outlet openings 26 by respective brazed or similar sealing joints 31 and 32 and the ducts 29 and 30 communicate through the inlet openings 25 and through the outlet openings 26 with the cooling chamber 24 that is constituted by the aforementioned peripherally sealingly closed gap between the faceplate 12 and the backing plate 23. Thus, the ducts 29 and 30 constitute a part of means for circulating a cooling fluid through the cooling chamber 24 in that the cooling fluid which is supplied into the cooling chamber 24 through the inlet ducts 29 and the inlet openings 25 flows through the cooling chamber 24 over the approximately 1 cm long paths to the respective adjacent outlet openings 26 to be discharged from the cooling chamber 24 through such outlet openings 26 and through the outlet ducts 30. The aforementioned solid regions surrounding the ducts 29 and 30, either because they are parts of the support 14 or because they are constituted by pipes that are rigid and rigidly connected to the support 14, hold the regions of the backing plate 23 to which they are connected in predetermined constant positions relative to the support 14. As mentioned before, the coolant flow at least into the cooling chamber 24 is maintained separate from the actuator coolant to prevent undesirable heating and thermal distortion of the heat exchanger constituted by the backing plate 23 and the faceplate 12 from the actuator heat loads.

For the arrangement discussed above in conjunction with FIG. 2 of the drawing, the portion of the spring rate of the heat exchanger, which is constituted by the faceplate 12 and the backing plate 23, that affects actuator coupling is determined almost exclusively by the thickness of the faceplate 12. The backing plate 23 affects the overall spring rate of the actuator 15 being displaced, but loads generated in the backing plate 23 are transferred almost exclusively to the support 14 at the regions of the inlet and outlet openings 25 and 26. Therefore, the arrangement of FIG. 2 exhibits only about 5% displacement coupling between adjacent actuators 15. For atmospheric turbulence correction applications, low actuator coupling is desired to minimize residual rms phase errors in the outgoing laser beam.

In the arrangement of FIG. 2, the faceplate 12 and the backing plate 23 are so spaced from one another, and the actuator posts 28 have such heights that the actuators 15, after they are installed, can only change the configuration of the reflective surface 13 of the faceplate 12 from substantially planar to convex. However, in many instances, it is desired or necessary to change the configuration of the reflective surface 13 at least regionally even in the opposite sense, that is from planar or convex to concave. The arrangement of FIG. 2 is incapable of accomplishing this task since the movable members of the replaceable actuators 15 will dissociate themselves from the backing plate 23 when the reflective surface 13 is substantially planar and thus will not pull the backing plate 23 and ultimately the faceplate 12 with them in the rearward direction.

Figure 3:
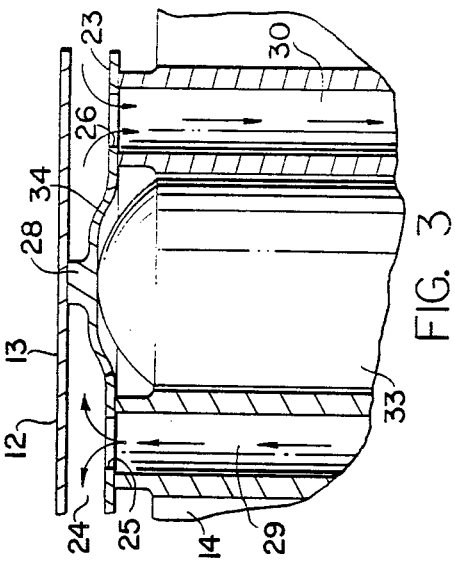
FIG. 3 is a view similar to FIG. 2 but of a modified construction, with an actuator present and its axial position adjusted properly.

To remedy this situation, that is, to provide for the change of the configuration of the reflective surface 13 of the faceplate 12 in the negative sense, that is toward concaveness, it is proposed by the present invention to modify the above arrangement in the manner depicted in FIG. 3 of the drawing. It may be seen there that the height of the actuator pad 28 is less than the spacing between the faceplate 12 and the stationary regions of the backing plate 23 that surround the openings 25 and 26. FIG. 3 of the drawing also shows that a movable member or part 33 of the actuator 15, when in its mounted and properly adjusted position, deforms a region 34 of the backing plate 23 that surrounds the actuator post 28 toward the faceplate 12 to such an extent that the actuator post 28 bridges the gap between the region 34 of the backing plate 23 and the faceplate 12. The actuator post 28 is again rigidly connected, such as by brazing, with the faceplate 12. Yet, in this situation, since the backing plate 23 has resilient properties and since the region 34 of the backing plate 23 has been deformed out of its relaxed condition by the action of the movable member 33 of the actuator 15 thereon, the rearward movement of the faceplate 12 with the backing plate 23 will not cease when the reflective surface 13 obtains its planar configuration. Rather, this movement will continue to the point of equilibrium between the actuator force, the spring force of the deformed region 34 of the backing plate 23 and the spring force, if any, of the faceplate 12, so that the reflective surface 13 of the faceplate 12 will assume a concave configuration at least at the region of the respective actuator 15.

It will be appreciated that the aforementioned spring or backing plate 23 that forms the rear closure of the heat exchanger or cooling chamber 24 provides for loading the actuators 15 against the heat exchanger without the need for permanent bonding between the movable member 33 of the respective actuator 15 and the backing plate 23 of the heat exchanger. As mentioned before, when the unactivated actuators 15 are installed, they are compressively preloaded, in the arrangement depicted in FIG. 3 of the drawing, against the backing plate 23 and ultimately against the faceplate 12. The extent of the attendant deformation of the region 34 of the backing plate 23 may be in the area of 10 $\mu$m. This preload allows the heat exchanger to remain in contact with the actuator 15 when there is a negative displacement about the 10 $\mu$m bias. When the respective actuator 15 is inserted into or installed in the respective passage 27 of the support 14 and set in place by a fine threaded (100+threads/inch) plug, turning of the threaded plug, which constitutes or is a part of the stationary member of the actuator 15, displaces the actuator 15 toward the heat exchanger until the convex end cap of the movable member 33 makes contact with the backing plate 23. Thereafter, in the design illustrated in FIG. 3 of the drawing, an additional turning of the threaded plug through about 14° produces the desired 10 $\mu$m preload displacement of the region 34 of the backing plate 23.

The motion of the faceplate 12 during the preloading of the heat exchanger by the respective actuator 15 can be measured by a nine element square array of high resolution linear variable displacement transducers. The central one of these transducers is placed over the actuator 15 to be preloaded, and the eight surrounding transducers sense any relative movement at the adjacent actuator locations. Alternatively, the motion of the faceplate 12 can be measured using known holographic techniques prior to final polishing of a reflective coating of the faceplate 12, or by the use of known interferometric techniques after the final polishing of the reflective coating. A special wrench with a rotation limiter may be used for turning the actuator plug to prevent overstressing the backing plate 23 which would occur if the actuator 15 were inserted too far.

Figure 4:
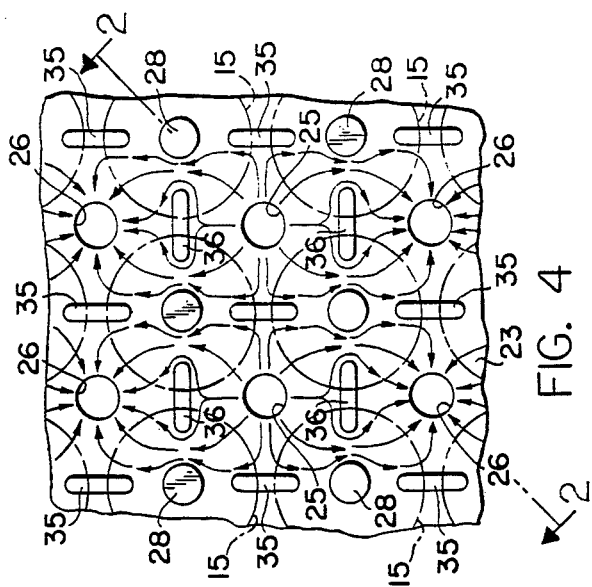
FIG. 4 is a transverse sectional view taken in a plane indicated at 4—4 in FIG. 2.

FIG. 4 of the drawing shows that arrays of baffles 35 and 36 may be arranged between the individual actuator posts 28. These baffles 35 and 36, which are preferably attached to or made integral only with the faceplate 12 constitute another part of the aforementioned circulating means in that they, influence the flow or circulation of the cooling fluid between the inlet openings 25 and the adjacently situated outlet openings 26 in the manner indicated by respective arrows in FIG. 4 of the drawing, and particularly they force the flow of the cooling fluid, usually water of liquid ammonia, to pass close to the actuator posts 28, thus efficiently cooling the same. This baffling produces a symmetric flow pattern around each actuator post 28 to ensure uniform cooling. The above-described heat exchanger is capable of providing adequate faceplate and actuator post cooling at heat fluxes of up to 20W/cm$^2$ with laminar flow. The advantage of the laminar flow is that flow induced forces that would otherwise produce mirror jitter are virtually eliminated and the coolant pressure losses can be limited to less than 10 psi. The large amount of parallel flow paths, one for every two actuators 15, means that the coolant is uniformly distributed across the active aperture. The design can be scaled directly to larger aperture systems by increasing the diameters of the various components of the assembly 10. Then, the flow rate required scales directly with the faceplate area to be cooled.

The heat exchanger and substrate designs discussed above are compatible with several low thermal expansion coefficient materials, such as molybdenum, silicon carbide, and silicon. It is currently preferred to use molybdenum as the material of construction, because it produces the largest allowable differential stroke between adjacent actuators without exceeding the mechanical capability of the (stress limited) backing plate 23.

While the present invention has been illustrated an described as embodied in a particular construction of a mirror assembly, it will be appreciated that the present invention is not limited to this particular example; rather, the scope of protection of the present invention is to be determined solely from the attached claims.

We claim:

1. A mirror arrangement comprising
   a support;
   a flexible faceplate having a reflective surface;
   a flexible backing plate;
   means for so mounting said faceplate and said backing plate on said support that said reflective surface faces forwardly and said backing plate is situated rearwardly of said faceplate and that said backing plate and said faceplate delimit a gap between themselves;

a plurality of elongated actuator arranged on said support rearwardly of said backing plate in a predetermined distribution pattern and each having a longitudinal axis and including a mounting member which is so stationarily mounted on said support that said longitudinal axis extends substantially perpendicularly to said backing plate and an actuating member which is movable along said longitudinal axis relative to said mounting member and exerts a selected force on said backing plate at least when the respective actuator is energized;

means for transmitting the forces exerted by said actuating members on said backing plate to said faceplate, including a plurality of transmitting portions situated between said backing plate and said faceplate each in alignment with a different one of said actuators; and means for so connecting regions of said backing plate that are situated between said transmitting portions to said support as to be substantially stationary relative to said support.

2. The mirror arrangement as defined in claim 1, wherein said backing plate has resilient properties.

3. The mirror arrangement as defined in claim 2, wherein said mounting members are mounted on said support for adjustment of their axial position and are so positioned relative to said support that each of said actuating members regionally deforms said backing plate between said regions against a resilient force of said backing plate toward said faceplate even in the absence of energization of the respective actuator.

4. The mirror arrangement as defined in claim 1, wherein said transmitting portions are rigidly connected to at least one of said backing plate and faceplate.

5. The mirror arrangement as defined in claim 4, wherein said transmitting portions are integral with one of said backing plate and faceplate.

6. The mirror arrangement as defined in claim 1, and further comprising means for sealing said gap with respect to the exterior of the mirror arrangement to form an enclosed cooling chamber, and means for circulating a cooling fluid through said cooling chamber.

7. The mirror arrangement as defined in claim 6, wherein said backing plate has a plurality of inlet and outlet openings situated in said regions between said transmitting portions; and wherein said circulating means includes means for supplying fresh cooling fluid to said inlet openings and discharging spent cooling fluid from said outlet openings through said connecting means.

8. The mirror arrangement as defined in claim 7, wherein said connecting means includes a plurality of connecting portions connected to said support and to the respective one of said regions, situated between said actuators, and bounding respective ducts communicating with said inlet and outlet openings, respectively, to constitute said supplying and discharging means, and extending between said actuators in substantial parallelism therewith.

9. The mirror arrangement as defined in claim 8, wherein said connecting portions are constituted by portions of said support; and wherein the regions of said connecting portions of said support that surround those ends of said ducts that are close to said backing plate are individually rigidly and sealingly connected to said backing plate at said regions of said backing plate around respective ones of said openings.

10. The mirror arrangement as defined in claim 9, wherein said backing plate has resilient properties; and wherein said mounting members are mounted on said support for adjustment of their axial position and are so positioned relative to said support that each of said actuating members deforms only a portion of said backing plate that is situated between said regions of said backing plate against a resilient force of said portion of said backing plate toward said face plate even in the absence of energization of the respective actuator.

11. The mirror arrangement as defined in claim 7, wherein said inlet and outlet openings alternate with one another.

12. The mirror arrangement as defined in claim 7, and further comprising means for directing the flow of the cooling fluid from said inlet openings toward said outlet openings, including a multitude of baffles extending across said cooling chamber between said faceplate and said backing plate.

13. The mirror arrangement as defined in claim 1, wherein each of said actuators has a crowned end portion that acts on said backing plate.

14. A mirror arrangement comprising
a support;
a flexible faceplate having a reflective surface;
a flexible backing plate;
means for so mounting said faceplate and said backing plate on said support that said reflective surface faces forwardly and said backing plate is situated rearwardly of said faceplate and that said backing plate and said faceplate delimit a gap between themselves;

at least one elongated actuator arranged on said support rearwardly of said backing plate, having a longitudinal axis and including a mounting member which is so stationarily mounted on said support that said longitudinal axis extends substantially perpendicularly to said backing plate and an actuating member which is movable along said longitudinal axis relative to said mounting member and is merely in contact with said backing plate to make said actuator readily replaceable and to exert a selected force on said backing plate at least when the respective actuator is energized only as long as said force is directed toward said faceplate;

means for transmitting the force exerted by said actuating member on said backing plate to said faceplate;

means for sealing said gap with respect to the exterior of the mirror arrangement to form an enclosed cooling chamber; and means for circulating a cooling fluid through said cooling chamber.

15. The mirror arrangement as defined in claim 14, wherein said backing plate has a plurality of inlet and outlet openings distributed in a predetermined pattern over the backing plate; and wherein said circulating means includes means for supplying fresh cooling fluid to said inlet openings and discharging spent cooling fluid from said outlet openings.

16. The mirror arrangement as defined in claim 15, wherein said supplying and discharging means includes a plurality of ducts communicating with said inlet and outlet openings, respectively.

17. The mirror arrangement as defined in claim 16, wherein said ducts are formed in said support; and wherein the regions of said support that surround those ends of said ducts that are close to said backing plate are individually rigidly and sealingly connected to said backing plate at the regions of respective ones of said openings.

18. The mirror arrangement as defined in claim 17, wherein said backing plate has resilient properties; and wherein said mounting member is mounted on said support for adjustment of its axial position and is so positioned relative to said support that said actuating member deforms only a portion of said backing plate that is situated between immediately adjacent ones of said regions of said openings against a resilient force of said portion of said backing plate toward said faceplate even in the absence of energization of the respective actuator.

19. The mirror arrangement as defined in claim 15, wherein said inlet and outlet openings alternate with one another.

20. The mirror arrangement as defined in claim 15, and further comprising means for directing the flow of the cooling fluid from said inlet openings toward said outlet openings, including a multitude of baffles extending across said cooling chamber between said faceplate and said backing plate.

21. The mirror arrangement as defined in claim 14, wherein each of said actuators has a crowned end portion that acts on said backing plate.

* * * * *